(12) United States Patent
Carter

(10) Patent No.: US 6,367,403 B1
(45) Date of Patent: Apr. 9, 2002

(54) BOATING ACCESSORY CONTAINER

(75) Inventor: David J. Carter, Queensville (CA)

(73) Assignee: MBC Rotomould Inc., Newmarket (CA)

( * ) Notice: Subject to any disclaimer, the term of this patent is extended or adjusted under 35 U.S.C. 154(b) by 0 days.

(21) Appl. No.: 09/783,024

(22) Filed: Feb. 15, 2001

(51) Int. Cl.⁷ .................................................. B63B 9/00
(52) U.S. Cl. ...................................... 114/343; 114/364
(58) Field of Search ............................... 114/343, 347, 114/364

(56) References Cited

U.S. PATENT DOCUMENTS

| | | |
|---|---|---|
| 1,929,833 A | 10/1933 | Van Vuren |
| 3,765,632 A | 10/1973 | Riggs |
| 3,775,895 A | 12/1973 | Jachim |
| 4,271,624 A | 6/1981 | Peluso |
| 4,671,009 A | 6/1987 | Faunce |
| 5,092,263 A | 3/1992 | Hutchison et al. |
| 5,165,198 A * | 11/1992 | Kilian, III .................... 383/100 |
| D334,094 S | 3/1993 | Braid |
| D355,760 S | 2/1995 | Sanfilippo |
| D361,888 S | 9/1995 | Kahl et al. |
| 5,560,145 A | 10/1996 | Anderson |
| 5,715,876 A * | 2/1998 | Burt ............................ 114/343 |
| 5,996,273 A | 12/1999 | George |
| 6,035,800 A | 3/2000 | Clifford |
| 6,101,966 A | 8/2000 | Cumisky |

* cited by examiner

Primary Examiner—Jesus D. Sotelo
(74) Attorney, Agent, or Firm—Ridout & Maybee LLP

(57) ABSTRACT

A boating accessory container for attachment to the gunwale of a small watercraft comprises a storage box for holding boating accessories such as fishing tackle and safety gear; first attachment means on the rear wall of the storage box for releasably securing the storage box to the gunwale of one of the sides of the watercraft; and second attachment means on the rear wall of the storage box for releasably securing the storage box to the inner surface of one of the sides of the watercraft. The second attachment means comprising one or more resilient attachment means intermediate the first attachment means and the bottom of the storage box, each of said resilient attachment means comprising a suction cup means facing away from the rear wall of the storage box.

17 Claims, 4 Drawing Sheets

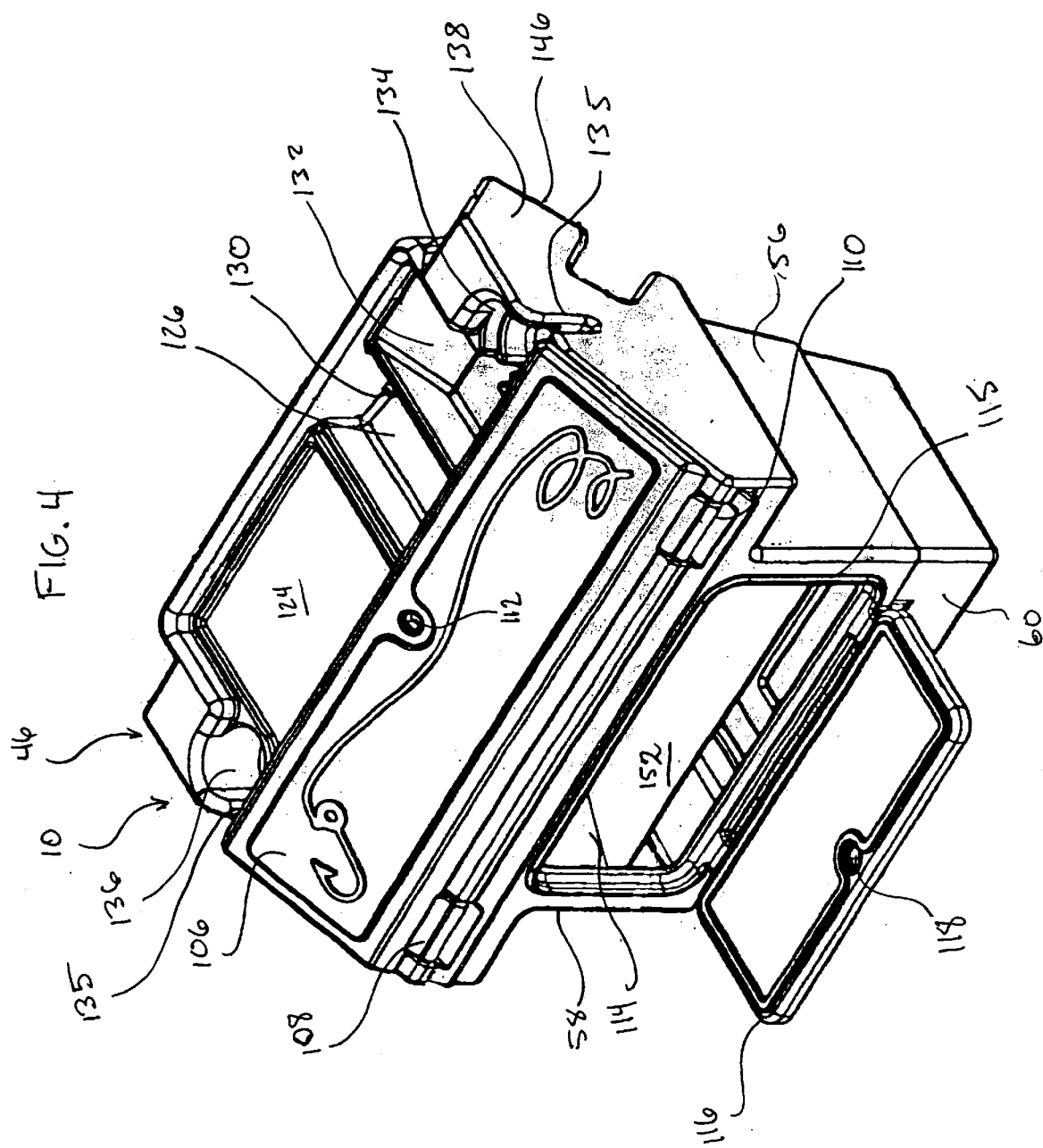

BOATING ACCESSORY CONTAINER

FIELD OF THE INVENTION

This invention relates to a storage container for boating accessories, such as fishing equipment and safety gear, which is releasably securable to the gunwale of a small watercraft.

BACKGROUND OF THE INVENTION

Small watercraft, including canoes and small motorized boats, are frequently used for fishing. However, such watercraft typically do not have built-in storage compartments to enable the safe and efficient storage of safety equipment such as fire extinguishers and first-aid kits or fishing equipment such as rods, lures, hooks, live bait and the like.

The prior art relating to this field shows that a number of storage containers have been built to address this and similar problems.

For example, U.S. Pat. No. 6,035,800, issued Mar. 14, 2000 to Clifford relates to a dry storage box which is releasably attachable along the gunwale of a canoe or other small watercraft. The dry box disclosed by Clifford comprises a rectangular bin with a hinged lid which is provided with a pair of clamping arms to secure it to the gunwale.

U.S. Pat. No. 6,101,966, issued Aug. 15, 2000 to Cumisky, discloses a utility station having an aerodynamic shape which is supported by a bracket above the boat deck.

U.S. Pat. No. 4,271,624, issued Jun. 9, 1981 to Peluso, describes a portable tackle and bait holder which is secured above the gunwale of a boat and is provided with upstanding side walls which serve as windshields.

U.S. Pat. No. 4,671,009, issued Jun. 9, 1987 to Faunce, relates to a basket-like structure having arms which hook over the gunwale of a boat and which can be used for storage of fishing equipment.

SUMMARY OF THE INVENTION

The present invention relates to a container for boating accessories such as fishing tackle and safety equipment which can be quickly and easily attached to, and removed from, the gunwale of a small watercraft.

The boating accessory container according to the present invention comprises a storage box having at least one storage compartment. The rear wall of the storage box is provided with first attachment means which are located near the top of the storage box and which releasably secure the storage box to the gunwale of the watercraft.

Also provided are second attachment means on the rear wall of the storage box for releasably securing the storage box to the inner surface of the side of the watercraft. The second attachment means comprises a resilient suction cup which provides a resilient connection between the rear wall of the storage box and the inner surface of the boat hull. This resilient connection provides additional support and dampens vibration and reduces noise.

In addition, the suction cup can preferably be adjusted inward and outward of the rear wall of the storage box so as to allow leveling of the storage box.

Accordingly, one aspect of the invention provides a boating accessory container for a small watercraft having a hull with a pair of longitudinal sides, each having an inner surface, an opposed outer surface and a gunwale extending along an upper edge thereof, the boating accessory container comprising: (a) a storage box having a top, a bottom, and comprising a plurality of walls enclosing one or more storage compartments, one of the plurality of walls comprising a rear wall extending between the top and the bottom of the storage box; (b) first attachment means on the rear wall of the storage box and proximate the top thereof for releasably securing the storage box to the gunwale of one of the sides of the watercraft; and (c) second attachment means on the rear wall of the storage box for releasably securing the storage box to the inner surface of one of the sides of the watercraft, the second attachment means comprising one or more resilient attachment means intermediate the first attachment means and the bottom of the storage box, each resilient attachment means comprising suction cup means attached to the a proximal end of the base and facing away from the rear wall of the storage box.

In a preferred aspect of the invention, the first attachment means comprises one or more J-shaped securing hooks attached to the rear wall of the storage box. Each of the hooks has a straight portion extending rearwardly and outwardly of the rear wall, and a hooked portion connected to the straight portion having a distal end which extends toward the rear wall.

Preferably, the straight portion of each of the J-shaped securing hooks extends into a hook-receiving aperture in the rear wall of the storage box, the hook-receiving aperture being provided with securing means which releasably grip the straight portion of the securing hook, such that when the securing means releases its grip, the securing hook is free to slide into and out of the hook-receiving aperture. Thus, the securing hooks can be adjusted inwardly and outwardly of the rear wall.

In yet another preferred aspect, each of the resilient attachment means further comprises a threaded extension rod having a proximal end secured to a distal end of the stem of the resilient attachment means and collinear therewith, and wherein the rear wall of the storage box is provided with one or more rod-receiving apertures. Each of the rod-receiving aperture has a threaded interior and is engaged with the threaded rod of one the attachment means, such that threading or unthreading the rod results in inward or outward displacement of the suction cup means relative to the rear wall of the storage box. This permits leveling of the storage box.

In yet another preferred aspect, the boating accessory container according to the present invention includes a top storage compartment accessible through the top wall of the storage box and a front storage compartment accessible through the front wall of the storage box. Both the top storage compartment and the front storage compartment are accessible through lids which are hinged to open by about 90 degrees to provide additional work surfaces.

BRIEF DESCRIPTION OF THE DRAWINGS

The invention will now be described, by way of example only, with reference to the accompanying drawings, in which:

FIG. 4 is a perspective view of the boating accessory container of FIG. 1, taken from the top and the front thereof, showing the top lid closed and the front lid open.

DETAILED DESCRIPTION OF PREFERRED EMBODIMENTS

Figure 1:
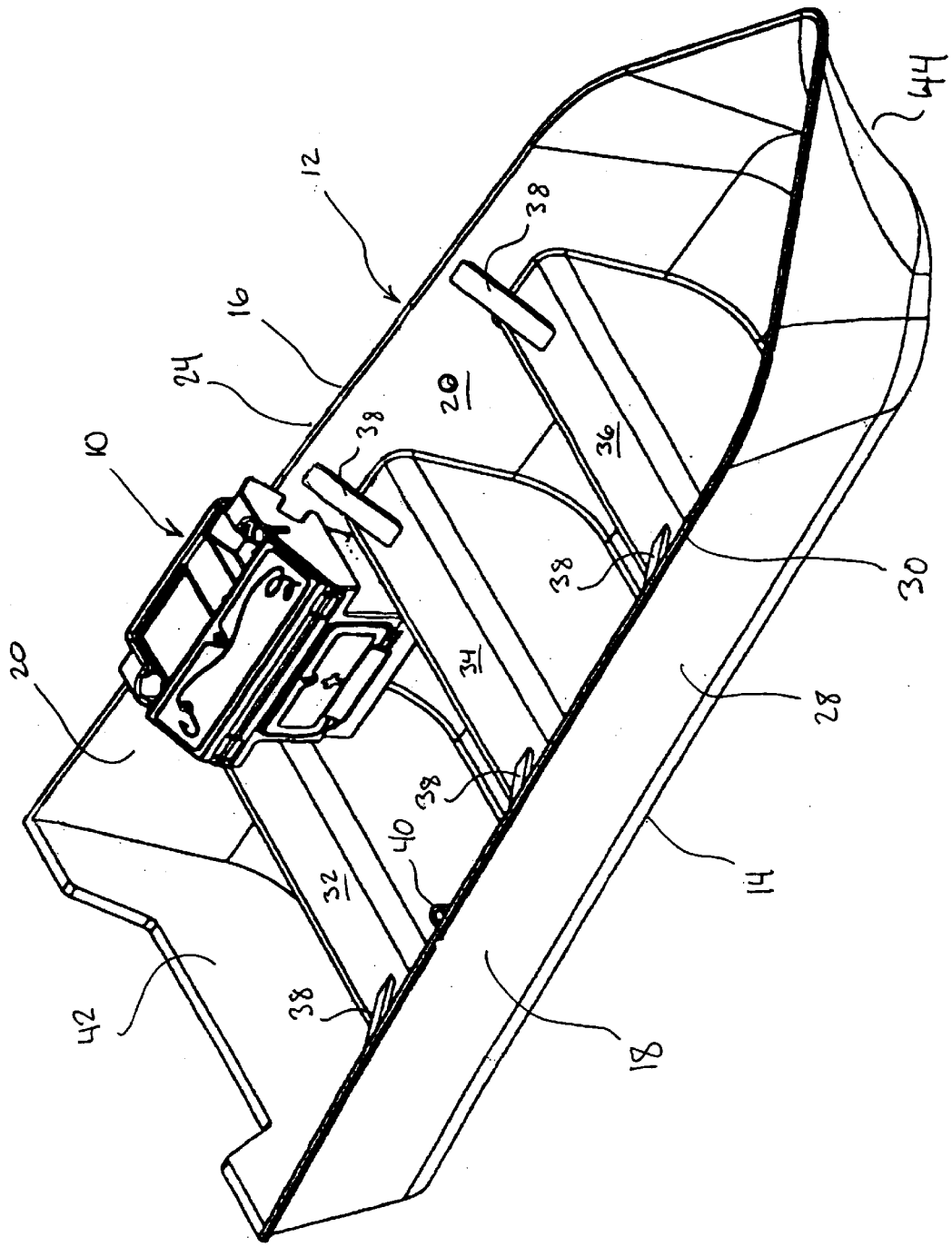
FIG. 1 is a perspective view of a preferred boating accessory container according to the present invention mounted on the gunwale of a small watercraft.
Figure 2:
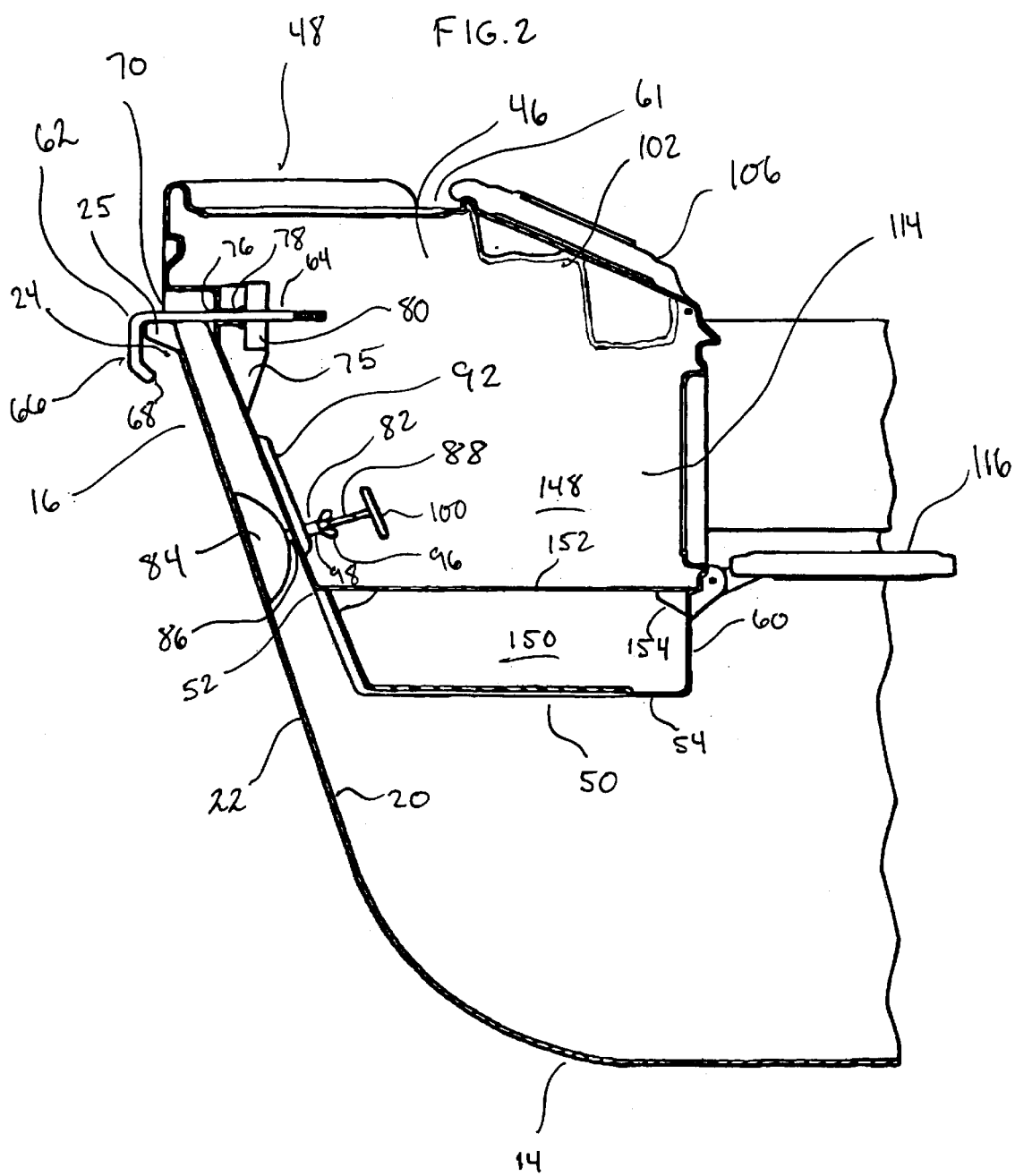
FIG. 2 is a cross-sectional view along line II—II of FIG. 1.

The drawings illustrate a preferred boating accessory container 10 according to the present invention. FIG. 1 illustrates the preferred container 10 secured to a small boat 12 of the type which is typically used for recreational fishing. Boat 12 has a hull 14 including a pair of longitudinally-extending sides 16 and 18. The port side 16 of boat 12 has an inner surface 20, an opposed outer surface 22 and a gunwale 24 extending along the upper edge thereof. Similarly, the starboard side 18 of boat 12 has an inner surface 26 (not visible in drawings), an opposed outer surface 28 and a gunwale 30 extending along an upper edge thereof. As shown in FIG. 2, the gunwale 24 is provided with a lip 25 extending outwardly of the outer surface 22. Gunwale 30 is also provided with such a lip.

The boat 12 also includes three seats 32, 34 and 36 extending across the hull 14 in spaced relation to one another, with a pair of brackets 38 extending at an angle between the top of each seat and the inner surfaces of the hull. Provided on the gunwale on each side of the boat is an oar holder bracket. Only oar holder bracket 40 is visible on the gunwale 30 of starboard side 18 in FIG. 1. However, it should be appreciated that an identical oar holder bracket 40 is located on the gunwale 24 of the port side 16, which is hidden by the container 10 shown in FIG. 1.

Boat 12 also includes a stern 42 at the rear thereof to which a motor (not shown) may be mounted, and a bow 44 at the front at which the port and starboard sides 16 and 18 converge.

As shown in the drawings, the preferred boating accessory container 10 comprises a storage box 46 having a top 48 and a bottom 50. Storage box 46 comprises a plurality of walls enclosing one or more storage compartments, namely a rear wall 52, a closed bottom wall 54 located at the bottom of the box and connected to the rear wall, a pair of opposed side walls 56 and 58 connected to the bottom wall 54 and the rear wall 52, a front wall 60 connected to the bottom wall 54 and the side walls 56 and 58, and a top wall 61 at the top of the box connected to the rear wall 52, side walls 56 and 58 and the front wall 60.

The boating accessory container further comprises first attachment means on the rear wall 52 of the storage box 46 and proximate the top 48 thereof for releasably securing the storage box 46 to the gunwale 24. Preferably, the first attachment means comprises one or more J-shaped securing hooks. In the preferred embodiment shown in the drawings, the storage box 46 is secured to the gunwale 24 by a pair of such hooks 62. Each hook 62 has a straight portion 64 extending rearwardly and outwardly from the rear-wall 52, and a hooked portion 66 connected to the straight portion 64. The hooked portion 66 has a distal end 68 which extends back toward the rear wall 52. As shown in FIG. 2, each of the hooks 62 is adapted to hook around the lip 25 of gunwale 24.

Figure 3:
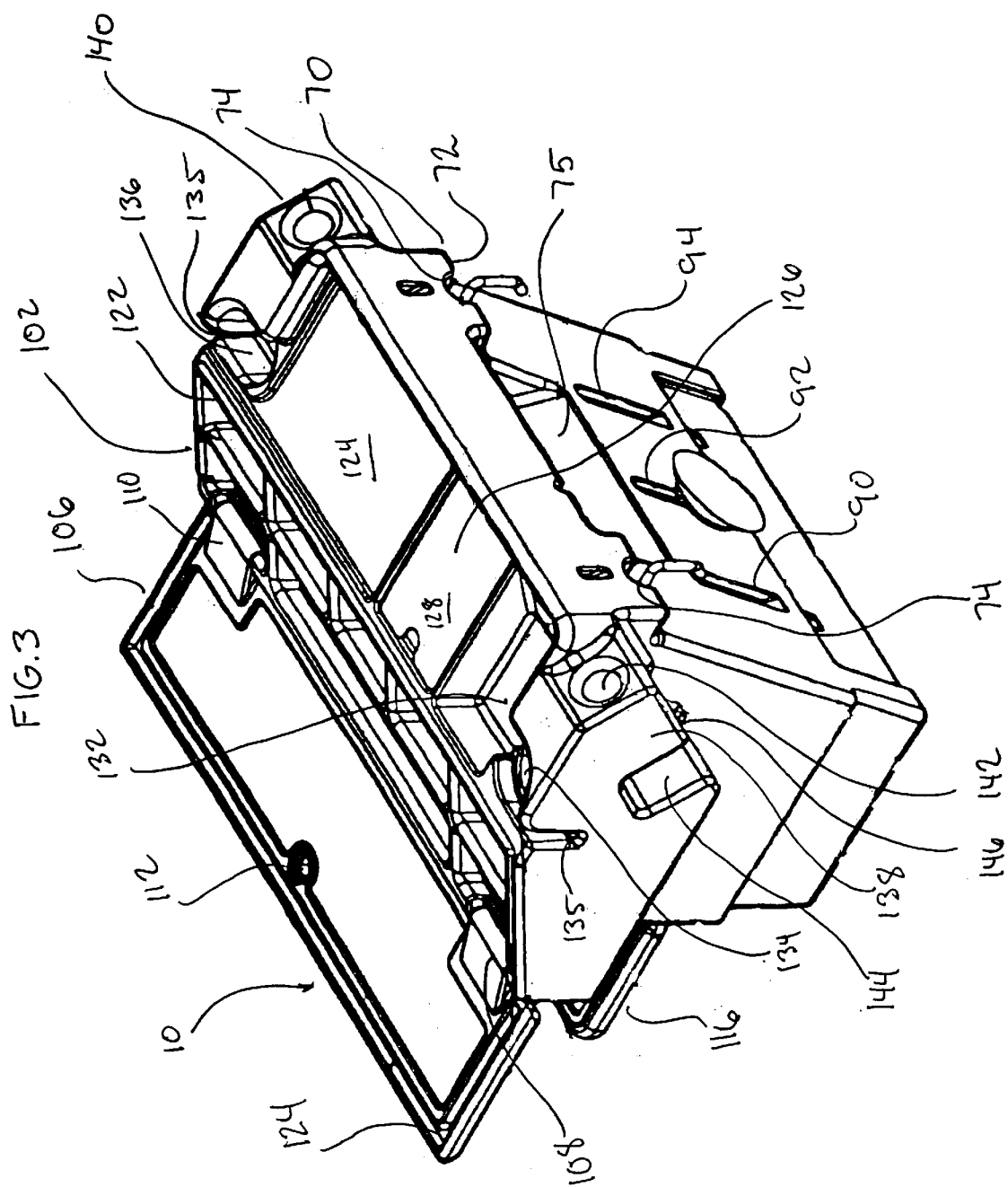
FIG. 3 is a perspective view of the boating accessory container of FIG. 1 taken from the top and from the rear thereof, with the top and front lids open.

As illustrated in FIG. 3, the J-shaped securing hooks 62 are spaced from one another on the rear wall 52 and are equally spaced from the top and bottom of the box 46 so that box 46 will be level when it is mounted to the boat 12.

As best shown in FIGS. 2 and 3, the rear wall 52 of the storage box 46 has an inwardly-extending ledge 70 proximate the top 48 of box 46 extending longitudinally along the entire rear wall. As shown in FIG. 3, the straight portions 64 of hooks 62 are either level with or located slightly above (that is, closer to the top 48) the bottom surface 72 of ledge 70. This ensures that, when the boating accessory container 10 is mounted to the gunwale 24 of boat 12, the ledge 70 rests on the gunwale, thereby providing the container 10 with greater stability. In the preferred embodiment shown in the drawings, the ledge 70 is interrupted by upwardly-extending indentations 74 into which the straight portions 64 of hooks 62 extend.

The rear surface 52 of the storage box 46 is also provided with an indentation 75 which is sized and located to receive the oar holder bracket 40 located on the gunwale 24.

As illustrated in FIG. 2, the straight portion 64 of each hook 62 extends through the rear wall 52 of storage box 46 and into the interior thereof. The hooks 62 extend through apertures 76 which are preferably reinforced with metal inserts 78. A securing means in the form of a tightening knob 80 is provided around the straight portion 64 of hook 62 which can be loosened and tightened by turning. Thus, the hooks 62 can be moved in and out relative to the rear wall 52, to thereby allow the storage box 46 to be snugly secured against the gunwale 24.

The boating accessory container 10 further comprises second attachment means on the rear wall 52 of storage box 46 for releasably securing the storage box 46 to the inner surface 20 of the port side 16 of boat 12. In the preferred boating accessory container 10, the second attachment means comprises one or more resilient attachment means 82 having a suction cup 84 facing away from the rear wall 52 of the storage box 46 and being attached to the inner surface 20 of the boat 12. In the preferred embodiment shown in the drawings, the resilient attachment means 82 further comprises a stem 86 having a proximal end attached to and integrally formed with the suction cup 84 and a distal end secured to a threaded extension rod 88. Preferably, the suction cup 84 and stem 86 are integrally formed from a resilient polymeric material and the threaded extension rod is formed of metal.

The rear wall 52 of storage box 46 is provided with one or more rod-receiving apertures. In the preferred embodiment shown in the drawings, these apertures are in the form of elongate slots 90, 92 and 94, of which only the central slot 92 is provided with a resilient attachment means 82. The provision of slots permits upward and downward movement of the resilient attachment means 82, thereby permitting the attachment means 82 to avoid obstructions on the inner surface 20 of the hull 14. As shown in FIG. 2, a wing nut 96 may preferably be used to secure the attachment means 82 at a particular position in the slotted aperture 92.

Furthermore, provided over the stem 86 of the resilient attachment means 82 is a metal sleeve 98 having a threaded interior which engages the threads on the extension rod 88. Rod 88 can be threaded into the metal sleeve 98 by turning handle 100, causing the suction cup 84 to move outwardly from the rear wall 52 of storage box 46. This has the effect of tilting the storage box 46 relative to the hull 14, thereby permitting it to be leveled. The handle 100 on threaded rod 88 is located inside the storage box and can be accessed through one of the compartment doors, described below.

As mentioned above, the boating accessory container 10 according to the invention is preferably used for storage of fishing equipment and boating safety equipment. Fishing tackle, such as lures, hooks, etc., is preferably stored in a top storage compartment 102 which is divided into a number of subcompartments. Top storage compartment 102 is accessible through a top lid 106 having a pair of hinges 108, 110 by which it is joined to the top wall of the storage box 46. Preferably, the top lid 106 is provided with a latch 112 and may optionally be provided with a lock (not shown).

Boating safety equipment, such as a first aid kit and a fire extinguisher, is preferably stored in front storage compartment 114 which is accessible through a hinged front lid 116 provided on the front wall 60 of storage box 46. Preferably, the front lid 116 is provided with a latch 118, and may optionally be provided with a lock (not shown).

As shown in the drawings, both the top lid 106 and the front lid 116 can be opened to provide additional work surfaces. Accordingly, the lids 106 and 116 are flat, and the hinges limit the maximum extent to which they can be opened such that, when fully opened, they extend outwardly of the front wall 60 of the storage box 46 in the manner shown in FIG. 1, and are substantially horizontal when fully opened.

Furthermore, both the top lid 106 and front lid 116 may preferably be provided with waterproof closures to prevent damage to the contents of the compartments. In the preferred embodiment shown in the drawings, the perimeter of the top storage compartment 102 is provided with an upstanding male rib 122, and the top lid 106 is provided about its perimeter with a female rib 124 into which the rib 122 can be received. The perimeter of the opening into front compartment 114 is preferably provided with a resilient gasket 115 to prevent entry of water.

The top wall of storage box 46 is preferably also provided with a horizontal work surface 124, a storage well 132 for additional storage space, a pair of cup holders 134 and 136, and a minnow well 126 closed by a lid 128. The minnow well 126 is preferably provided with a stopper 130 which allows the well to be drained. The top wall is also provided with a pair of drainage trenches 135 which permit run-off of liquids from the cup holders 134.

As shown in FIG. 2, the front compartment may preferably be divided into two sub-compartments, an upper sub-compartment 148 and a lower sub-compartment 150 separated by a dividing wall 152. Preferably, the edge of dividing wall 152 rests on a ledge 154 and can be lifted as shown in FIG. 4 to permit access to the lower sub-compartment 150.

As shown in the drawings, the side walls 56 and 58 are each provided with an inwardly-extending ledge, to thereby make the lower part of the storage box narrower than the upper portion. This allows the storage box 46 to fit between two seats of the boat 12 as shown in FIG. 1.

Also provided proximate the rear wall 52 of the storage box 46 are a pair of rod holders 138 and 140. The upper portion of rod holder 138 is provided with an aperture 142 through which the end of a fishing rod (not shown) can extend. The lower portion of rod holder 138 comprises a stop 144 against which the end of the fishing rod abuts. The rear wall 146 of rod holder 138 is preferably sloped so as to avoid the structural brackets 38 on the seats 32 and 34.

Although the invention has been described in connection with certain preferred embodiments, it is not intended to be limited thereto. Rather, the invention includes within its scope all embodiments which may fall within the scope of the following claims.

What is claimed is:

1. A boating accessory container for a small watercraft having a hull with a pair of longitudinal sides, each having an inner surface, an opposed outer surface and a gunwale extending along an upper edge thereof, the boating accessory container comprising:
   (a) a storage box having a top, a bottom, and comprising a plurality of walls enclosing at least one storage compartment, one of the plurality of walls comprising a rear wall extending between the top and the bottom of the storage box;
   (b) first attachment means on the rear wall of the storage box and proximate the top thereof for releasably securing the storage box to the gunwale of one of the sides of the watercraft; and
   (c) second attachment means on the rear wall of the storage box for releasably securing the storage box to the inner surface of one of the sides of the watercraft, the second attachment means comprising at least one resilient attachment means intermediate the first attachment means and the bottom of the storage box, each of said resilient attachment means comprising a suction cup means facing away from the rear wall of the storage box.

2. The boating accessory container according to claim 1, wherein the first attachment means comprises at least one J-shaped securing hooks attached to the rear wall of the storage box, each of the hooks having a straight portion extending rearwardly and outwardly of the rear wall, and a hooked portion connected to the straight portion having a distal end which extends toward the rear wall.

3. The boating accessory container according to claim 2, wherein the first attachment means comprises a pair of said J-shaped securing hooks, said hooks being spaced from one another and being spaced by substantially the same amount from the top of the storage box.

4. The boating accessory container according to claim 3, wherein the rear wall of the storage box has an inwardly extending ledge proximate the top thereof and wherein, when the storage box is mounted on the watercraft, the ledge is in engagement with the gunwale.

5. The boating accessory container according to claim 2, wherein the straight portion of each of said J-shaped securing hooks extends into a hook-receiving aperture in the rear wall of the storage box, the hook-receiving aperture being provided with securing means which releasably grip the straight portion of the securing hook, such that when the securing means releases its grip, the securing hook is free to slide into and out of the hook-receiving aperture.

6. The boating accessory container according to claim 1, wherein each of said resilient attachment means further comprises a stem having a proximal end secured to the suction cup means, and a threaded extension rod having a proximal end secured to a distal end of the stem and collinear therewith, and wherein the rear wall of the storage box is provided with at least one rod-receiving apertures, each said rod-receiving aperture having a threaded interior and being threadingly engaged with the threaded rod of one said attachment means, such that threading or unthreading the rod results in inward or outward displacement of the suction cup means relative to the rear wall of the storage box.

7. The boating accessory container according to claim 6, wherein a turning knob is provided at a distal end of each said threaded extension rod, said distal end of the rod and the turning knob being located inside the storage box.

8. The boating accessory container according to claim 1, wherein said storage box further comprises a pair of opposed side walls extending between the top and bottom of the storage box and connected to the rear wall, and wherein said second attachment means comprises one said resilient suction attachment means positioned centrally intermediate the side walls of the storage box.

9. The boating accessory container according to claim 1, wherein said plurality of walls of the storage box comprises:
   (a) said rear wall;
   (b) a closed bottom wall located at the bottom of the box and connected to the rear wall;

(c) a pair of opposed side walls extending between the top and the bottom of the box, said side walls each being connected to the bottom wall and the rear wall;

(d) a front wall extending between the top and bottom of the box, said front wall being connected to the bottom wall and the side walls; and (e) a top wall at the top of the box connected to the side walls, rear wall and front wall.

10. The boating accessory container according to claim 9, wherein said at least one storage compartment includes a top storage compartment accessible through the top wall of the storage box.

11. The boating accessory container according to claim 10, wherein the top storage compartment is accessible through a top lid hinged to the top wall of the storage box, the top lid being closed by latching means.

12. The boating accessory container according to claim 11, wherein the top lid is flat and is hinged so that, when opened to its maximum extent, it extends outwardly of the front surface of the storage box and is substantially perpendicular thereto so as to provide a work surface.

13. The boating accessory container according to claim 11, wherein the top lid forms a watertight seal with the top wall of the storage box.

14. The boating accessory container according to claim 9, wherein said at least one storage compartment includes a front storage compartment accessible through the front wall of the storage box.

15. The boating accessory container according to claim 14, wherein the front storage compartment is accessible through a hinged front lid provided on the front wall of the storage box, said front lid being closed by latching means.

16. The boating accessory container according to claim 14, wherein the front lid is flat and is hinged so that, when opened to its maximum extent, it extends outwardly of the front surface of the storage box and is substantially perpendicular thereto so as to provide a work surface.

17. The boating accessory container according to claim 14, wherein the front lid forms a watertight seal with the front wall of the storage box.

* * * * *